United States Patent [19]

Stratton

[11] 4,094,497

[45] June 13, 1978

[54] VISE FOR FLY TYING, SMALL PARTS AND THE LIKE

[76] Inventor: Paul E. Stratton, R.R. #1, Box 220, Fairfax, Iowa 52228

[21] Appl. No.: 864,276

[22] Filed: Dec. 27, 1977

[51] Int. Cl.² .............................................. B25B 1/22
[52] U.S. Cl. ...................................... 269/71; 269/97; 269/234
[58] Field of Search ................ 269/71, 97, 234; 81/6, 81/7, 8; 279/37, 109

[56] References Cited

U.S. PATENT DOCUMENTS

| 1,142,024 | 6/1915 | Chott | 269/239 X |
| 2,586,636 | 2/1952 | Fischer et al. | 269/97 X |
| 4,039,178 | 8/1977 | Odames | 269/97 X |

*Primary Examiner*—Robert C. Watson
*Attorney, Agent, or Firm*—Haven E. Simmons; James C. Nemmers

[57] ABSTRACT

A small vise for fly tying, holding small parts and the like features a pair of jaws which are slidable within an enveloping nose piece. The jaws and nose are formed with complementary sliding surfaces which together with a transverse guide pin between the jaws assure that the gripping faces of the jaws are parallel throughout their travel as well as impart a self-locking ability to the jaws.

10 Claims, 11 Drawing Figures

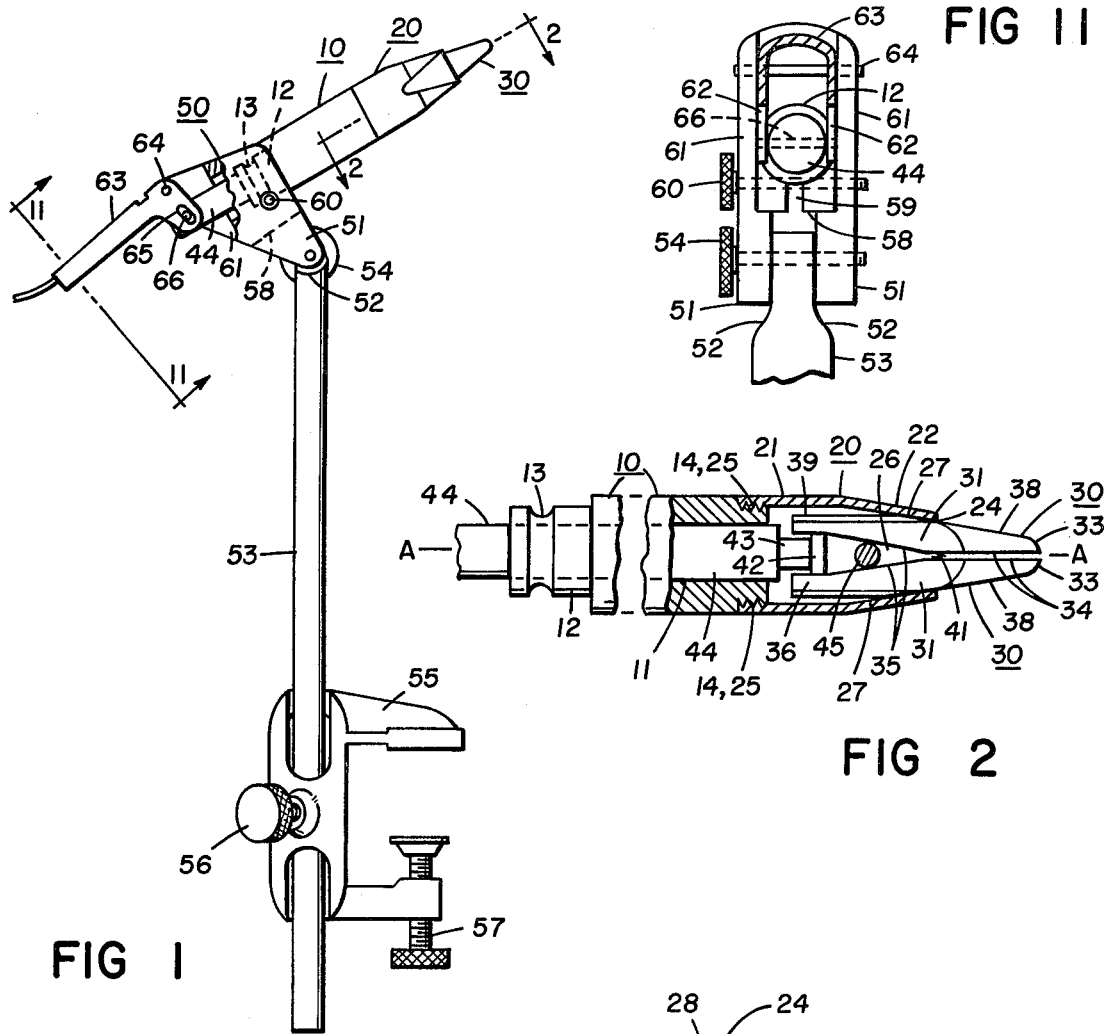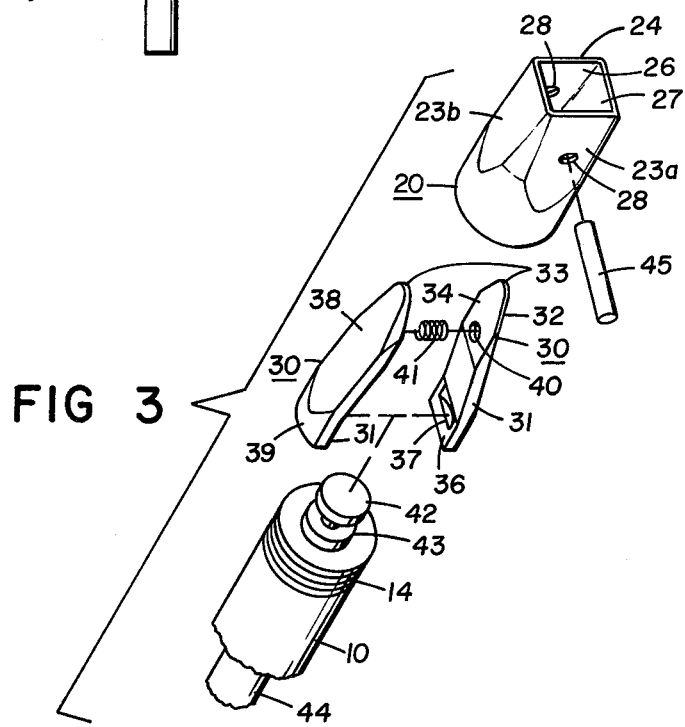

VISE FOR FLY TYING, SMALL PARTS AND THE LIKE

BACKGROUND OF THE INVENTION

So far as is known most small vises for fly tying, holding small parts for inspection, for assembly or for similar purposes are such that the clamping or gripping faces of the jaws do not remain parallel but tend to tilt more or less relative to each other depending upon the size of the work to be grasped. In the case of round objects particularly, especially curved round objects such as fish hooks, a great deal of force is thereby required to hold the object securely which often damages or even destroys the vise in relatively short time. It is thus the primary object of the present invention to provide a vise of the nature concerned, the gripping faces of whose jaws remain parallel throughout their travel.

SUMMARY OF THE INVENTION

Essentially the invention embodies a hollow nose piece having a pair of inner jaw guide surfaces which converge toward the forward end of the nose. A pair of jaws having parallel forward gripping faces are provided with a pair of outer jaw guide surfaces which are complementary with and slidably engage the pair of inner guide surfaces of the nose as the jaws move axially of the nose to adjust to the work to be grasped, the jaw gripping faces thus remaining parallel throughout that jaw movement. In order to keep the aforementioned two pairs of guide surfaces in engagement and the jaw gripping faces parallel, the jaws are provided with a pair of inner guide surfaces, parallel to respective ones of the outer jaw guide surfaces, which inner jaw guide surfaces diverge rearwardly from the jaw gripping faces. Between the inner jaw guide surfaces is disposed a cylindrical pin transversely through and anchored in the nose, the wall of the pin slidably engaging the inner jaw guide surfaces and keep the two outer jaw guide surfaces in engagement with the two inner guide surfaces of the nose throughout travel of the jaws. Preferably, the angle of the jaw guide surfaces with respect to the jaw gripping surfaces is kept small enough so that once tightly engaged with the work the jaws remain locked of their own accord.

The nose and jaws are supported by a cylindrical shank whose forward end carries the nose. The supporting shank is axially bored to receive an operating rod anchored in the rear end of the jaws, axial movement of the rod relative to the shank thus moving the jaws relative to the nose. An appropriate mechanism at the rear of the shank and operating rod provides the necessary force by which the jaws are caused to grip and lock onto the work. The shank in turn is mounted so that it can be clamped at various horizontal and vertical angles, as well as be rotably adjusted about its axis, in order to present the work in a convenient attitude.

BRIEF DESCRIPTION OF THE DRAWINGS

FIG. 1 is an elevational view of a vise according to the invention shown completely assembled.

FIG. 2 is an elevational view, partially in section along the line 2—2 of FIG. 1, showing details of the vise which particularly form the subject matter of the invention.

FIG. 3 is an isometric exploded view of the parts shown in FIG. 2.

FIG. 11 is a partially sectioned view taken along the line 11—11 of FIG. 1 and illustrating details of the manner in which the vise is mounted and operated.

DETAILED DESCRIPTION OF THE PREFERRED EMBODIMENT

Figure 8:
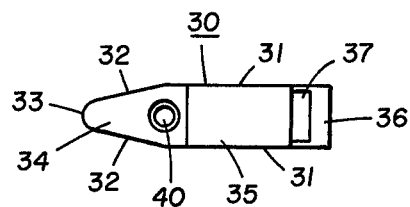
FIGS. 8-10 are plan, elevational and sectional views of one of the two jaws shown in FIGS. 1-3.

As shown in FIGS. 1-3, the vise includes a cylindrical shank 10 which is axially bored at 11 and shouldered adjacent its rear end to provide a supporting tennon 12. The latter is annularly grooved at 13 adjacent its rear end for purposes later described, and the forward end of the shank 10 is exteriorly threaded at 14. Onto the latter is screwed the rear end of a hollow nose 20, preferably in the form of an investment casting. The rear portion 21 of the nose 20 is essentially cylindrical, but its forward portion 22 comprises two pairs of opposite side walls 23a, 23b which converge forwardly to form a rectangular mouth 24. The interior of the rear nose portion 21 is also cylindrical and appropriately threaded at 25 to receive the shank threads 14. The interior of the forward nose portion 22 is formed with a first pair of opposed jaw faces 26, normal to a plane A—A (see FIGS. 2, 5, 6 and 7) through the axis of the nose 20 and centrally through the side walls 23a, which pair of faces 26 extend rearwardly parallel to each other from the mouth 24. A second pair of opposed jaw guide faces 27 diverge rearwardly from the mouth 24 symmetrically with respect to the plane A—A. Finally, the side walls 23a are transversely bored at 28 in the plane A—A and normal to the axis of the nose 20 for purposes later described.

Figure 9:
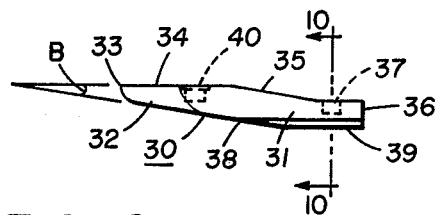
Figure 10:
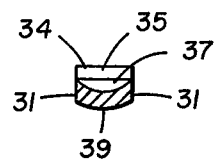
Figure 4:
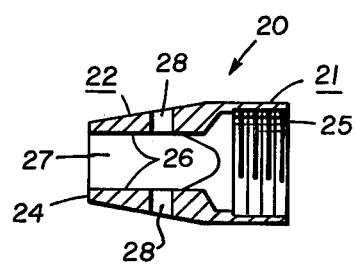
FIG. 4 is a sectional view axially through the nose shown in FIGS. 1-3.
Figure 6:
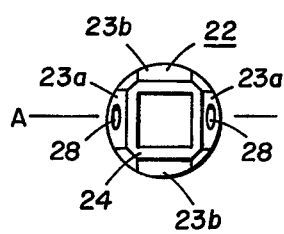
FIGS. 6 and 7 are end views of the nose of FIG. 5.
Figure 5:
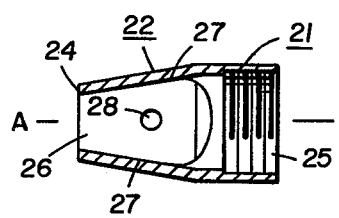
FIG. 5 is another sectional view axially through the nose but at right angles to the view of FIG. 4.
Figure 7:
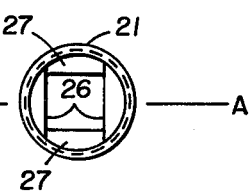

The two jaws 30 are finger-like members, also preferably investment castings, having, as shown in FIG. 8, an overall width formed by parallel edge faces 31 equal to the spacing of the nose jaw guide faces 26. The forward portions of the two jaw guide faces 31 converge at 32 to form rounded jaw tips 33 from which, as shown in FIGS. 9 and 10 taken in conjunction with FIG. 2, the jaw gripping faces 34, which are shown in planar form, extend rearwardly parallel to the plane A—A. From the rear ends of the faces 34 a pair of opposed jaw guide faces 35 diverge rearwardly symmetrically with respect to the plane A—A and parallel to the nose jaw guide faces 27, terminating in short knuckles 36 parallel to the plane A—A whose opposed surfaces are provided with radiused transverse keyways 37 for purposes later described. The opposite exterior surfaces of the jaws 30 diverge rearwardly from the jaw tips 33, also parallel to the jaw guide faces 35, to provide a pair of opposite jaw guide surfaces 38 which terminate at the knuckles 36. The opposite exterior surfaces of the knuckles 36 are radiused at 39 concentric with the interior radius of the rear nose portion 21. Accordingly, it will be clear that the respective jaw guide faces 27 of the nose 20 and the guide faces 35 and 38 of the jaws 30 are all parallel to each other and symmetrically disposed with respect to plane A—A. Finally, the rear ends of the jaw gripping faces 34 are provided with opposed spring seats 40.

The jaws 30 are assembled in the nose 20 as shown in FIGS. 2 and 3. A bias spring 41 is inserted in the seats 40 between the gripping faces 34 at the same time a headed key 42, formed by an annular relief 43 adjacent the forward end of the cylindrical operating rod 44, is inserted in the keyways 37, the rod 44 being a sliding fit in the shank bore 11. The nose 20 is then fitted to the so-far-assembled shank 10, jaws 30 and rod 44 so that the jaw guide faces 26 and 31 engage each other and the guide faces 27 and 38 also engage each other before the nose 20 is thereafter screwed onto the shank 10 by means of the threads 14 and 25. A cylindrical jaw guide pin 45 is then inserted through the bores 28 and suitably secured in place, as by threads or staking. The pin 45 must be of such diameter that its exterior wall is always in sliding contact with the jaw guide surfaces 35 and at the same time maintains the jaw guide surfaces 38 in sliding contact with the nose jaw guide surfaces 27.

As will be observed especially from FIG. 2, axial movement of the operating rod 44 will move the jaws 30 such that the cooperating guide surfaces 27 and 38, plus the guide surfaces 35 and the guide pin 45, maintain the jaw gripping faces 34 parallel to each other at all times throughout jaw movement. The bias spring 41 is not strictly necessary but is preferred because it takes up the operating clearances, which are on the order of 0.002 inches, between the nose jaw guide faces 27 and the guide pin 45. The jaw guide surfaces 26 and 31 in turn prevent skewing of the jaws 30 during their travel. Accordingly, the more the rod 44 is urged forwardly in the shank 10, the tighter the jaws 30, owing to the jaw guide surfaces 27, 35, 38 and the pin 45, will grip the work with a uniformly parallel bite. As the latter occurs it will be observed from FIG. 2 that the jaws 30 would tend to tilt apart, the jaw guide faces 38 pivoting about the nose mouth 24, were it not for the guide pin 45. This is the pin 45's most important role and hence not only, as mentioned, is its diameter fairly critical but also its location in the nose 20. The further rearward the pin 45 is from the nose mouth 24, consonant with the length of the jaw guide faces 27 and 38 and travel of the jaws 30, the more effectively the pin 45 resists deviations of the jaws 30 from parallel.

The shank 10 projects forwardly from a supporting casting 50 of generally triangular shape in side elevation. Adjacent the top of the forward face of the casting 50 a rearwardly extending bore rotably receives the supporting tennon 12 and groove 13 of the shank 10, as shown in FIGS. 1 and 11. The lower end of the casting 50 is formed to provide a depending clevis 51 which receives a pair of opposite flats 52 at the upper end of a supporting post 53. The casting 50 pivots relative to the post 53 upon a clamp screw 54 through the clevis 51 and the flats 52 so that the shank 10 can be adjusted to an appropriate attitude. The post 53 in turn is vertically slidable in a typical C-clamp 55 and the height of the shank 10 adjusted by a clamp screw 56, the clamp 55 in turn being fixed to a work bench by a clamp screw 57. From the roof 58 of the clevis 51 a pinch slot 59 extends upwardly and opens upon the shank tennon 12, a clamp screw 60 passing transversely through the casting 50, across the slot 59 and in the groove 13. The shank 10 can thus be rotably adjusted relative to the casting 50 and then clamped by the screw 60 to secure it, the groove 13 retaining the shank 10 in the casting 50 when the screw 60 is released.

The rear end of the casting 50 above the clevis 51 is forwardly relieved to expose the rear end of the shank tennon 12 and to provide a rearwardly extending clevis 61 between which passes the rear of the operating rod 44, as also shown in FIGS. 1 and 11. The clevis 61 receives the depending transverse legs 62 of an operating lever 63, the legs 62 straddling the rear end of the operating rod 44. The lever 63, which is shown as a stamping though it could just as well be a casting, is pivoted upon a pin 64 transversely through the clevis 61 and the upper ends of the legs 62. The lower ends of the latter are provided with lost motion slots 65 (only one being shown in FIG. 1) in which ride the exposed ends of a pin 66 transversely through the rear end of the operating rod 44. Accordingly, it is apparent that as the lever 63 is forced downwardly, the operating rod 44 will be driven forwardly to close the jaws 30 upon the work, as previously explained. Lifting the lever 63 in turn will release the jaws 30.

It will be observed from FIG. 1 that the connection between the operating rod 44 and the operating lever 63 is not a toggle joint. The latter is unnecessary, as is a screw drive for the rod 44, because of the nature of the relationship of the gripping face 34 to the outer guide face 38 of each jaw 30. As shown in FIG. 9, the included angle "B" between these two faces is preferably on the order of 9°, though this is somewhat subject to the particular material used for the nose 20 and jaws 30 as well as to the surface finish of the jaw guide faces 27 and 38. In any event, the resulting taper, that is, the 18 degree included angle between each pair of jaw guide faces 27 and 38, produces a self-locking action of the jaws 30 upon the work, as is well known in the cases of typical drill chucks. Hence, once the jaws 30 are forced by the lever 63 into tight engagement with the work, the jaws 30 will remain so even when pressure on the lever 63 is released, thus obviating the need for any mechanism, such as a toggle or screw, to maintain force on the rod 44. Indeed, some effort is required upon the lever 63 to release the jaws 30 from the work once they have been set.

In a working example of a vise according to the invention each jaw 30 has an overall length of 1.625 inches and an overall width between the guide faces 31 of 0.375 inches. The nose 20 is 1.32 inches long and 0.75 inches in diameter at its rear portion 21, the length of its two jaw guide faces 27 being about 0.80 inches. These dimensions, together with an angle "B" of 9° between the jaw faces 34 and 38, result in a jaw capacity of about 0 to 0.070 inches which is sufficient for most fish hooks and small parts. For greater capacity, say from 0.030 to 0.010 inches, the forward portions of the jaw gripping faces 34 could be recessed, additional sets of jaws 30 being made available in order to accommodate various ranges of work. Interchangeability of the sets is accomplished by unscrewing the nose 20 from the shank 10 and removing the guide pin 45. Significantly greater jaw capacities would require longer and larger diameter noses 20 and longer jaws 30. Obviously, also, the jaw gripping faces 34 need not be planar but could have different contours to fit special situations. Likewise, the jaw guide faces 27, 35 and 38 need not be planar, nor the guide pin 45 cylindrical, though the contours shown are those most readily and economically fashioned. Angles "B" of less than 9° could be used, too, but would diminish jaw capacity or require increased jaw travel, besides increasing the effort required to release the jaws 30. An angle of 9° or an overall included angle of 18° between each pair of guide faces 27 and 38 has been found most suitable in the present application from the standpoint of the amount of self-locking desired to hold, versus the amount of effort necessary to release, the jaws 30. Perhaps an overall included angle of about 22° is the most that could be used and still retain a suitable amount of self-locking. Beyond about 22°, depending of course upon the material, length and finish of the various jaw guide faces and lubrication, some sort of toggle or screw drive would be necessary for the operating rod 44 in order to retain the jaws 30 upon the work. This might well be desirable in those cases in which more or less instant release of the jaws 30 is wanted rather than the somewhat delayed release which occurs when self-locking is present.

In any event, though the invention has been described in terms of a particular embodiment, being the best mode known of carrying out the invention, it is not limited to that embodiment alone. Instead, the following claims should be read as encompassing all modifications of the invention falling within its scope and spirit.

I claim:

1. In a vise having a pair of jaws, means for actuating the jaws in order to selectively hold and release a workpiece, and means for mounting the vise, the improvement wherein: the jaws comprise a pair of finger-like jaw members having corresponding forward and rearward ends and corresponding opposed interior surfaces and corresponding opposite exterior surfaces symmetrically disposed with respect to a longitudinal axis therebetween, said interior surfaces of the jaw members including two sets of opposing faces, the first set extending parallel to each other rearwardly from the forward ends of the jaw members and consitituting workpiece gripping faces of the jaws, the second set of faces diverging rearwardly from the rear ends of the first set of faces, the first and second sets of faces being symmetrically disposed with respect to a first plane through said axis, said exterior surfaces of the jaw members including a third set of faces symmetrically disposed with respect to said first plane and intermediate the forward and rearward ends of the jaw members, the second and third faces of each jaw member forming parallel intersections with second planes normal to said first plane and parallel to said axis; a hollow nose member having open forward and rearward ends corresponding to said ends of the jaw members, the nose member having interior surfaces enveloping exterior surfaces of the jaw members concentrically with respect to said axis including a fourth set of faces disposed adjacent the forward end of the nose member and complementary with the third set of faces; a jaw guide member extending between and fixed in opposite wall portions of the nose member rearward of its forward end, the guide member intersecting said first axis and having exterior surfaces disposed between the second set of faces; exterior surfaces of the jaw members including the third set of faces and interior surfaces of the nose member including the fourth set of faces respectively slidably engaging each other during conjoint movement of the jaw members in forward and rearward directions in response to forces imposed upon the rearward ends thereof in opposite directions along said axis, exterior surfaces of the guide member also slidably engaging the second set of faces throughout said jaw member movement; and means associated with the rearward ends of the jaw member to provide said jaw member movement.

2. The vise of claim 1 wherein the second set of faces are planar and the exterior surface of the jaw guide member is cylindrical and in sliding tangential contact with the second set of faces.

3. The vise of claim 2 wherein the third and fourth sets of faces are also planar, and the second, third and fourth sets of faces all form equal angles of intersection with said first plane.

4. The vise of claim 2 wherein the first set of faces are also planar.

5. The vise of claim 1 including a compressible helical spring disposed in compression between the first set of faces adjacent their rearward ends.

6. The vise of claim 1 wherein the included angle between the third set of faces is less than about 22°.

7. The vise of claim 6 wherein the included angle between the third set of faces is about 18°.

8. The vise of claim 7 including a nose supporting member having a forward end secured to the rearward end of the nose member, the supporting member having a bore therethrough concentric with said axis, a jaw actuating member slidably disposed in said bore, one end of the actuating member being attached to the jaw members adjacent their rearward ends to apply force thereon upon movement of the actuating member in corresponding forward and rearward directions in said bore, and operating means effective to provide said actuating member movement and thus said jaw member movement.

9. The vise of claim 8 wherein the supporting member is rotable about said axis relative to the mounting means and including means retaining the supporting means in selected rotary positions relative to the mounting means.

10. The vise of claim 9 wherein said attachment between the actuating member and the jaw members permits rotation of the jaw, nose and supporting members as a unit relative to the actuating member.

* * * * *